(12) United States Patent
Kokusho

(10) Patent No.: US 9,891,660 B2
(45) Date of Patent: Feb. 13, 2018

(54) DISPLAY DEVICE

(71) Applicant: MITSUBISHI ELECTRIC CORPORATION, Tokyo (JP)

(72) Inventor: Takafumi Kokusho, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/084,904

(22) Filed: Mar. 30, 2016

(65) Prior Publication Data

US 2016/0313770 A1   Oct. 27, 2016

(30) Foreign Application Priority Data

Apr. 22, 2015   (JP) .................................. 2015-087205

(51) Int. Cl.
 *G09F 13/04*   (2006.01)
 *G06F 1/16*    (2006.01)
 *G02F 1/1333*  (2006.01)

(52) U.S. Cl.
 CPC .......... *G06F 1/1601* (2013.01); *G02F 1/1333* (2013.01); *G06F 2200/1612* (2013.01)

(58) Field of Classification Search
 CPC ........... G06F 1/1601; G06F 2200/1612; G02F 1/1333
 USPC ................................ 362/97.1, 368, 369, 632
 See application file for complete search history.

(56) References Cited

U.S. PATENT DOCUMENTS

| 5,432,626 | A  | * | 7/1995  | Sasuga  | G02F 1/133308 349/58 |
| 5,758,441 | A  | * | 6/1998  | Law     | G09F 13/16 40/205 |
| 5,838,401 | A  | * | 11/1998 | Uehara  | G02F 1/133308 349/150 |
| 8,439,549 | B2 | * | 5/2013  | Lee     | G06F 1/1601 349/58 |
| 2004/0218353 | A1 | * | 11/2004 | Imsand  | G06F 1/1601 361/679.55 |
| 2007/0127194 | A1 | * | 6/2007  | She     | G06F 1/1607 361/679.24 |
| 2010/0203924 | A1 | * | 8/2010  | Hirota  | G02F 1/133308 455/566 |
| 2011/0273760 | A1 | * | 11/2011 | Hsieh   | G02F 1/167 359/296 |

(Continued)

FOREIGN PATENT DOCUMENTS

JP   2012-215682 A   11/2012
JP   2013-205446 A   10/2013

*Primary Examiner* — Paultep Savusdiphol
(74) *Attorney, Agent, or Firm* — Studebaker & Brackett PC

(57) ABSTRACT

A display device includes: a display panel; a light source unit, which irradiates the display panel; a frame, which supports the display panel and the light source unit; and a protective plate, which is disposed on a front surface of the display panel, wherein the protective plate provided with: an adhesive member disposed in a peripheral area of the frame and; a fixing member that is supported by the adhesive member at a position corresponding to the adhesive member disposed in the peripheral area of the frame and is fixed to a fitting portion formed in the frame to be fixed to the frame, and wherein the fixing member includes a fall-prevention structure portion to suppress the protective plate from falling from the frame.

7 Claims, 5 Drawing Sheets

(56) References Cited

U.S. PATENT DOCUMENTS

| | | | |
|---|---|---|---|
| 2012/0039091 A1* | 2/2012 | Lee | G06F 1/1601 362/633 |
| 2012/0250276 A1 | 10/2012 | Nakajima | |
| 2014/0307217 A1* | 10/2014 | Nakano | G02F 1/133382 349/161 |
| 2015/0043231 A1* | 2/2015 | Clark | G09F 21/048 362/485 |

* cited by examiner

DISPLAY DEVICE

CROSS-REFERENCE TO RELATED APPLICATION

This application claims priority from Japanese Patent Application No. 2015-087205 filed on Apr. 22, 2015, the entire subject matter of which is incorporated herein by reference.

TECHNICAL FIELD

This disclosure relates to a display device provided with a protective plate that protects a display surface.

BACKGROUND

In general, in a display device which is used in electrical equipment of an automobile or various other devices, a protective plate may be disposed on a forefront surface (display surface) of the display device. The protective plate has a structure which can be attached to an intermediate frame of a light source unit for irradiating the display device, a housing for supporting the display device, or the like.

In a display device of (on-board) electrical equipment mounted on an automobile, in a case where the display device includes a protective plate on the forefront surface (display surface) thereof, if a markedly large impact is applied to the display device, the protective plate may fall from the display device. In order to strongly support the protective late, a large bonding area is required, and thus it is necessary to increase the size to form a sufficiently large frame area.

In a case where a structure is disposed on the display surface side of the protective plate to suppress falling of the protective plate from the display device, a flat design of the forefront surface of the display device cannot be realized and thus the design properties degrade. In a case where a housing covering the protective plate of the display device from the front side is provided in this way, the display surface is not the forefront surface of the display device and thus degradation in design properties is caused.

As described in JP-A-2012-215682, in a structure in which an intermediate frame to which a protective plate is fixed to a rear frame with a vibration isolator interposed therebetween, when a force greater than an impact which can be endured by an adhesive used to fix the protective plate is applied, there is a problem in that the protective plate is dropped from the adhesive or the intermediate frame and then the protective plate falls.

SUMMARY

This disclosure provides a display device capable of suppressing degradation in design properties of the display device and suppressing a protective plate from falling.

A display device of this disclosure includes: a display panel; a light source unit, which irradiates the display panel; a frame, which supports the display panel and the light source unit; and a protective plate, which is disposed on a front surface of the display panel, wherein the protective plate provided with: an adhesive member disposed in a peripheral area of the frame and; a fixing member that is supported by the adhesive member at a position corresponding to the adhesive member disposed in the peripheral area of the frame and is fixed to a fitting portion formed in the frame to be fixed to the frame, and wherein the fixing member includes a fall-prevention structure portion to suppress the protective plate from falling from the frame.

In the display device according to this disclosure, even when a strong impact is applied, it is possible to suppress degradation in design properties and to suppress a protective plate from falling using the fall-prevention structure portion of the protective plate.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Embodiment

Configuration of Display Device

Figure 1:
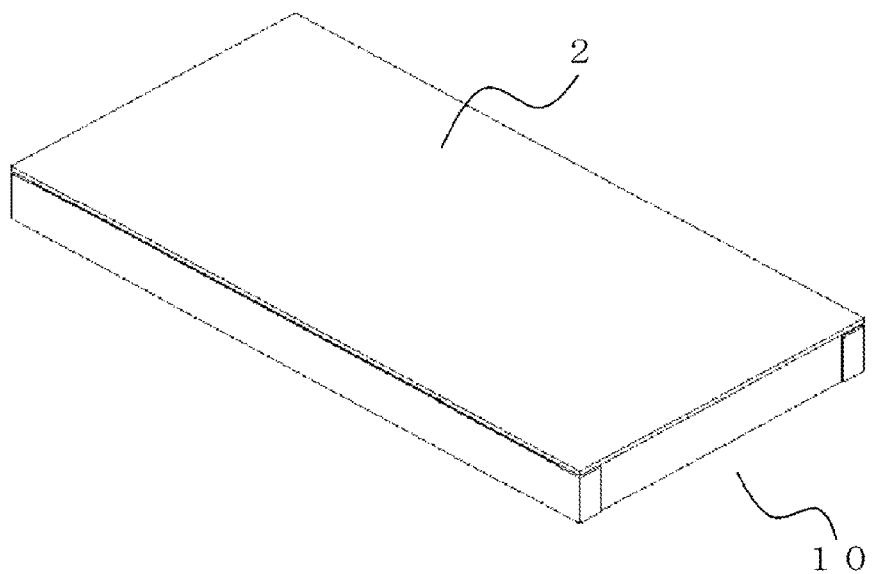
FIG. 1 is a perspective view of a display device according to this disclosure.
Figure 2:
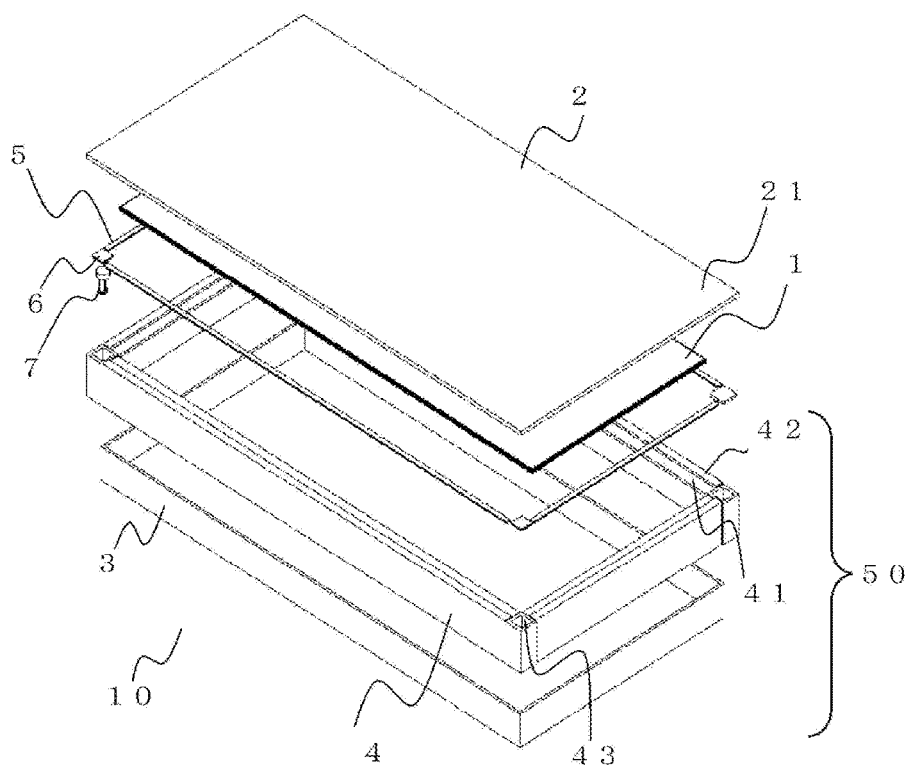
FIG. 2 is an exploded perspective view of the display device according to this disclosure.
Figure 3:
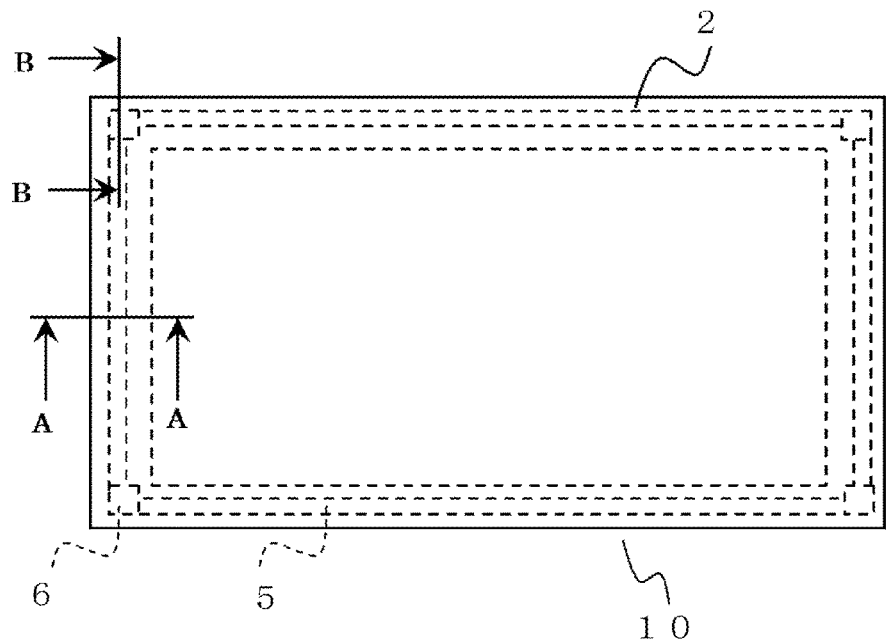
FIG. 3 is a front view of the display device according to this disclosure.

FIG. 1 is a perspective view of a display device according to an embodiment of this disclosure, FIG. 2 is an exploded perspective view of the display device illustrated in FIG. 1, and FIG. 3 is a front view of FIG. 1. In this disclosure, elements having an equal or equivalent function will be referenced by the same reference numerals.

As illustrated in FIGS. 1 to 3, a display device 10 according to an embodiment of this disclosure includes a display panel 1, on which an image is displayed, such as a liquid crystal display panel and a light source unit 50 that irradiates the display panel 1, and a protective plate 2 formed of, for example, glass is disposed on the front surface of the display panel 1. The light source unit 50, a light source emitting light, a light guide plate guiding light in a planar shape and emitting the light from an emission surface, and optical members (not illustrated) such as other members (a reflective sheet and an optical sheet) are disposed in a rear frame 3 having an opening. The optical members are clamped in cooperation with an intermediate frame 4 that is fitted to the rear frame 3.

The protective plate 2 is configured to be fixed to the intermediate frame 4, and the display panel 1 is optically attached (not illustrated) to the protective plate 2 and is supported by bonding the protective plate 2 and the intermediate frame 4. The display panel 1 may be fixed to the intermediate frame 4. At this time, the protective plate 2 is fixed to the intermediate frame 4.

Rear Frame

The rear frame 3 uses a point light source (not illustrated) as a light source. When the point light source is used as a light source, the rear frame 3 can further enhance heat radiation properties of the point light source using a material including metal such as aluminum as the material thereof, thereby suppressing loss of light and improving light utilization efficiency of the light source unit 50. In this embodiment, the rear frame 3 is formed of a metal material.

Display Panel

The display device 10 is constituted by disposing the display panel 1 on the light source unit 50. As the display panel 1, a liquid crystal display panel using birefringence of a liquid crystal material, a panel in which characters or images are printed on a transparent plate, or the like is used. In the liquid crystal display panel, a color filter substrate in which a color filter, a light-blocking layer, a counter electrode, and the like are formed on a substrate and a TFT substrate in which thin film transistors (TFTs), pixel electrodes, and the like are formed on a substrate as a switching panel are disposed to face each other. The display device 10 includes a spacer that maintains a gap between both substrates, a seal member that bonds the color filter substrate and the TFT substrate, a liquid crystal material that is interposed between the color filter substrate and the TFT substrate, an alignment film that aligns liquid crystal molecules, and a polarizing plate. The liquid crystal display panel controls alignment of a liquid crystal layer by turning on or off supply of a voltage using the switching panel and performs display by modulating light incident on the liquid crystal display panel based on an image signal.

Touch Panel

In the electrical equipment according to this disclosure, a touch panel (not illustrated) may be disposed on the front surface of the display panel 1 and may be optically attached to the display panel 1. In some cases, only the periphery of the touch panel is attached to the intermediate frame 4. The touch panel may employ a resistive membrane system, a projection capacitance system, or the like. The shape of the touch panel may be rectangular or the surrounding may be curved. A flexible board that transmits a signal is mounted on the touch panel and is connected to a touch panel controller circuit board (not illustrated) disposed on the rear surface of the display device. The board material of the touch panel may be a resin film or glass. When the touch panel is provided, the protective plate 2 is disposed on the front surface of the touch panel. Electrodes may be formed on the rear surface of the protective plate 2 to form a touch panel.

Protective Plate

The protective plate 2 is disposed on the front surface of the display panel 1 and is optically attached to the display panel 1, and a peripheral area thereof is attached to the intermediate frame 4. The shape of the protective plate 2 is illustrated and described to be rectangular in a plan view, but a side surface thereof may be curved. In the protective plate 2, a black frame is printed on the peripheral area. Accordingly, the design properties of the display device 10 are improved. A paint that partially transmits infrared rays may be used for the printed area. A low-reflection and anti-glare process is performed on the surface if necessary. The protective plate 2 may has a structure for suppressing transfer of a fingerprint to the surface thereof. A resin material, glass, or the like is used as the material of the protective plate 2. A hard coating process may be performed when the resin material is selected, and various reinforcing processes may be performed when the glass is selected. The material, the reinforcing type, the printing type, and the surface treatment type can be appropriately and freely selected.

Intermediate Frame

As illustrated in FIG. 2, the intermediate frame 4 is formed of a frame having a size larger than a display area of the display panel 1, and includes a display panel support portion 41 that supports the display panel 1 on the side opposite to the display surface of the display panel 1. A protective plate support portion 42 that supports the protective plate 2 is disposed in a peripheral area outside the display area of the display panel 1. The intermediate frame 4 includes four corners for the display panel support portion 41 and the protective plate support portion 42. The intermediate frame 4 includes a structure (not illustrated) that supports the optical members and positions the optical members. Accordingly, the intermediate frame 4 as an integrated member can support the optical members, the display panel 1, and the protective plate 2. The intermediate frame 4 may be provided with a side wall (not illustrated) covering the side surface of the protective plate 2. The intermediate frame 4 is formed of a material including a resin material and is formed of, for example, polycarbonate. The material can be appropriately and freely selected depending on the shape and the size of the intermediate frame 4, the clearance between the intermediate frame 4 and the protective plate 2, and the like.

The surface color of the intermediate frame 4 is black or white and can be appropriately and freely selected depending on the design of the electrical equipment including the display device 10. For example, by setting the surface color to black to correspond to a black frame printed on the protective plate 2, a design in which the protective plate 2 and the surrounding housings of electronic devices seem to be a unified body can be realized. For example, when the electrical equipment including the display device 10 is blue, it is possible to achieve compatibility of design properties and efficiency improvement of the light source unit by setting the surface color of the intermediate frame 4 to blue and setting the surface color of the reflecting sheet, the light guide plate, and parts facing the optical sheets among the optical members to white.

In the display device 10 according to this embodiment, the color of the intermediate frame 4 is not particularly designated. In order to suppress leakage of light from the clearance between the intermediate frame 4 and the display panel 1, the intermediate frame 4 is preferably set to black.

Fall-Prevention Structure Portion of Protective Plate

Figure 4:
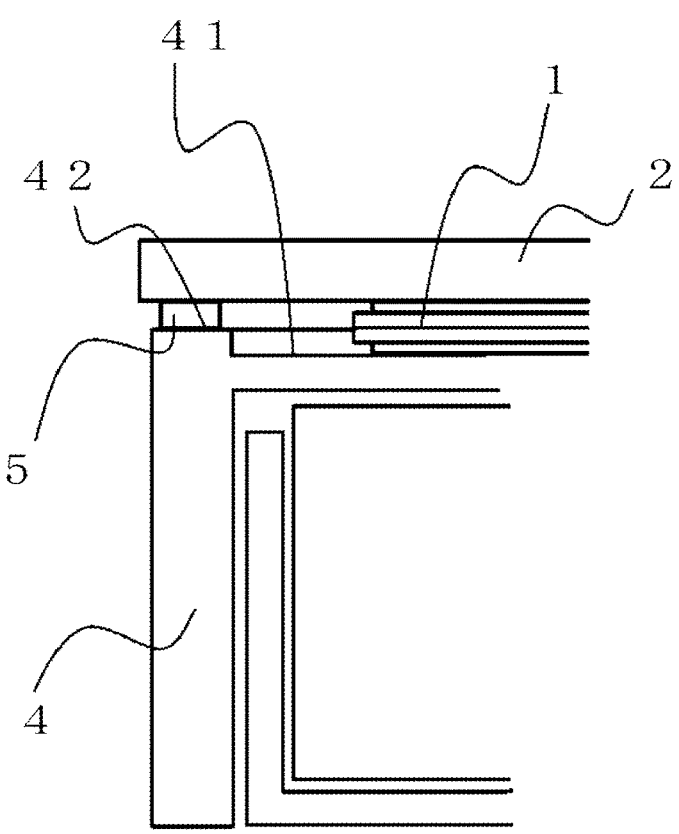
FIG. 4 is a cross-sectional view taken along line A-A in the display device illustrated in FIG. 3.
Figure 5:
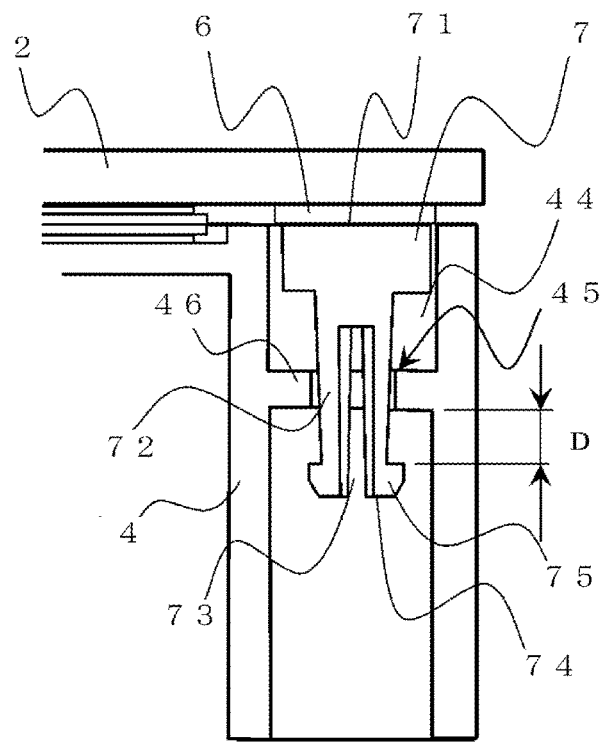
FIG. 5 is a cross-sectional view taken along line B-B in the display device illustrated in FIG. 3.

FIG. 4 is a cross-sectional view taken along line A-A of the display device illustrated in FIG. 3, and FIG. 5 is a cross-sectional view taken along line B-B of the display device illustrated in FIG. 3. As illustrated in FIGS. 4 and 5, the protective plate 2 is attached to the intermediate frame 4 using an adhesive member. A first adhesive member 5 fixing the protective plate 2 is disposed in the protective plate support portion 42. As illustrated in FIGS. 3 to 5, the second adhesive member 6 is disposed at the corners 43 of the intermediate frame 4 and at positions corresponding to intersections of the display panel support portion 41 and the protective plate support portion 42, and a second adhesive member 6 separated from the first adhesive member 5 and broader than the first adhesive member 5. Incidentally, the first adhesive member 5 and the second adhesive member 6 may not be separated from each other but may be formed as a unified body. The second adhesive member 6 may be formed in the same width as the first adhesive member 5 at the positions corresponding to the intersections of the protective plate support portion 42. The first adhesive member 5 and the second adhesive member 6 may be formed of different materials or may be formed of the same adhesive material.

As illustrated in the partial cross-sectional view of FIG. 5, a fixing member 7 having a fall-prevention structure portion is disposed to correspond to the second adhesive member 6 disposed at each corner of the protective plate 2. The fixing member 7 is provided with the second adhesive member 6 disposed on a upper portion 71 facing the protective plate 2 and is fixed to the protective plate 2. The fixing member 7 includes an extension portion 72 that is formed to be thinner than the upper portion 71 and protrudes in the direction opposite to the upper portion 71 (the direction perpendicular to the upper portion 71), in a cross-sectional view. The extension portion 72 includes a protrusion 75 protruding in a direction parallel to the upper portion 71 at a tip portion 74 thereof and a cutout 73 is formed at the center of the protrusion 75. A recessed portion 44 that receives the upper portion 71 of the fixing member 7 and a hole 45 into which the tip portion 74 is inserted to fit the fixing member 7 at a bottom 46 of the recessed portion 44 are formed at each corner 43 of the intermediate frame 4. The fixing member 7 is deformed by the cutout 73 of the extension portion 72, so that the tip portion 74 is inserted into the hole 45 of the intermediate frame 4, and thus the extension portion 72 is fitted to the hole 45 of the intermediate frame 4 by an elastic deformation. The sizes of the recessed portion 44, the hole 45 formed at the bottom 46 of the recessed portion 44, and the extension portion 72 are appropriately designed to be fitted to each other. A clearance D is formed between the bottom 46 and the protrusion 75. The clearance D is appropriately designed depending on load-deformation of the used adhesive member and an assumed impact to form a distance by which the adhesive member is deformed to absorb the stress when an impact or a load is applied thereto.

Figure 6:
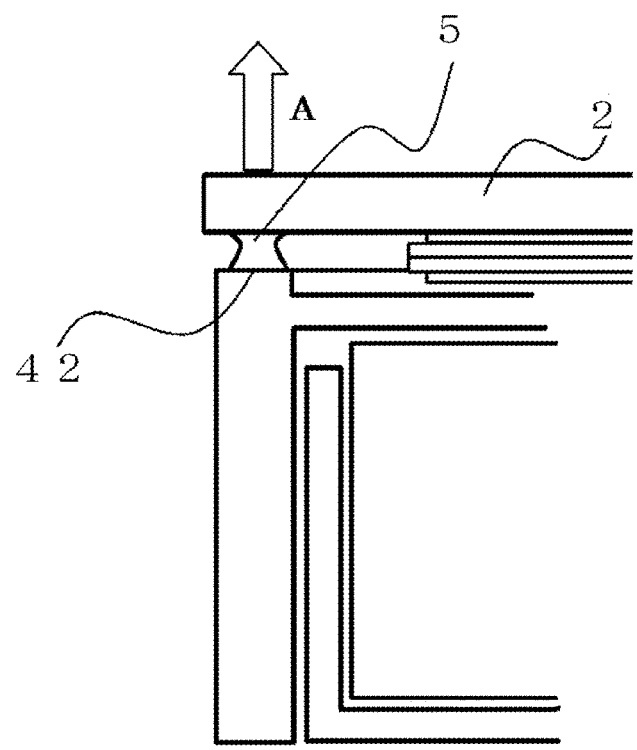
FIG. 6 is a cross-sectional view illustrating an operation of the display device according to this disclosure.
Figure 7:
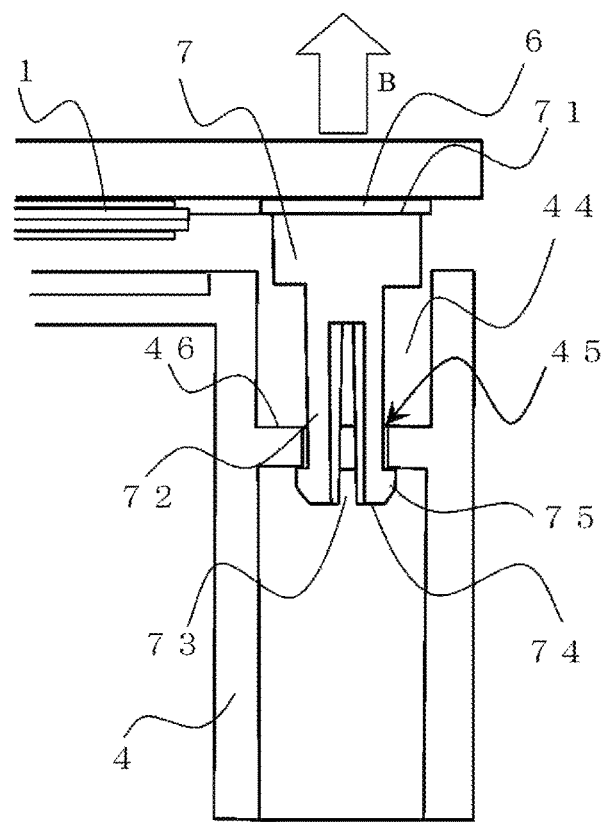
FIG. 7 is a cross-sectional view illustrating an operation of the display device according to this disclosure.

FIGS. 6 and 7 illustrate an operation of this disclosure, where FIG. 6 is a cross-sectional view taken along line A-A of the display device illustrated in FIG. 3 and FIG. 7 is a cross-sectional view taken along line B-B of the display device illustrated in FIG. 3. As illustrated in FIGS. 6 and 7, when an impact is applied to the protective plate 2, the stress is transmitted to the first adhesive member 5 and the second adhesive member 6 fixing the protective plate 2. As illustrated in FIG. 6, when a stress A is applied to the first adhesive member 5 disposed in the protective plate support portion 42 of the protective plate 2, an action of peeling off the protective plate 2 from the intermediate frame 4 is applied, but the first adhesive member 5 and the second adhesive member 6 themselves are deformed to absorb the impact and to suppress the protective plate 2 from falling.

On the other hand, as illustrated in FIG. 7, when a large stress B which cannot be fully absorbed by the first adhesive member 5 and the second adhesive member 6 formed in the peripheral area of the protective plate 2 is applied similarly to in FIG. 6, an action of peeling off the protective plate 2 from the intermediate frame 4 is applied and the first adhesive member 5 is peeled off from the intermediate frame 4 and moves in the direction B in which the protective plate 2 falls. In this disclosure, when a large stress B which cannot be fully absorbed by the first adhesive member 5 and the second adhesive member 6 is applied, the stress is applied to the fixing member 7 via the second adhesive member 6 disposed at each corner 43 of the intermediate frame 4.

When the stress is applied to the fixing member 7 and the protective plate 2 is dropped from the intermediate frame 4, the extension portion 72 of the fixing member 7 moves in the recessed portion 44 by the distance of the clearance D and the protrusion 75 comes in contact with the bottom 46 of the recessed portion 44. Accordingly, the protrusion 75 serves as a stopper to suppress the protective plate 2 from being dropped from the display device. At the same time, the fixing member 7 comes in contact with the bottom 46, the movement of the fixing member 7 is stopped, the stress is applied to the second adhesive member 6, and the second adhesive member 6 is deformed by the stress to absorb the impact. The distance of the clearance D satisfies D<Ea (distance), where Ea denotes an elongation when a load with which the adhesive member 5 is subjected to interfacial peeling or cohesion failure is applied.

When the protective plate 2 falls from the intermediate frame 4, the protective plate 2 is returned to the display device 10 and thus the protective plate 2 is possible to be fixed again to the display device 10.

Therefore, according to this disclosure, the extension portion 72 formed in the fixing member 7 is fixed to the intermediate frame 4 via the second adhesive member 6 disposed in the protective plate 2 interposed therebetween. Accordingly, when a strong impact is applied to the display device 10, the protrusion 75 moves by the distance of the clearance D in the recessed portion 44 of the intermediate frame 4 by the second adhesive member 6 and the extension portion 72 of the fixing member 7 formed to correspond to the second adhesive member 6 and comes I contact with the bottom 46 of the recessed portion 44 to suppress the protective plate 2 from falling. As a result, since the falling of the protective plate 2 can be suppressed without enlarging the bonding area between the protective plate 2 and the intermediate frame 4 in comparison with the related art, it is possible to suppress degradation in design properties and to improve safety of the display device 10. The movement of the fixing member 7 is stopped, the stress is applied to the second adhesive member 6, the second adhesive member 6 is deformed by the stress to absorb the impact applied to the protective plate 2, whereby it is possible to suppress the protective plate 2 from being damaged.

A fixing portion such as a hole for foxing the display device is formed on the rear side of the intermediate frame 4 and the display device can be attached using the fixing portion.

The fall-prevention structure portion may be disposed at any position on any of the upper, lower, right, and left sides in a front view of the display surface of the display panel 1, may be disposed on one side, or may be disposed as a pair on both right and left sides, and the disposing position thereof can be appropriately and freely selected.

Second Embodiment

Figure 8:
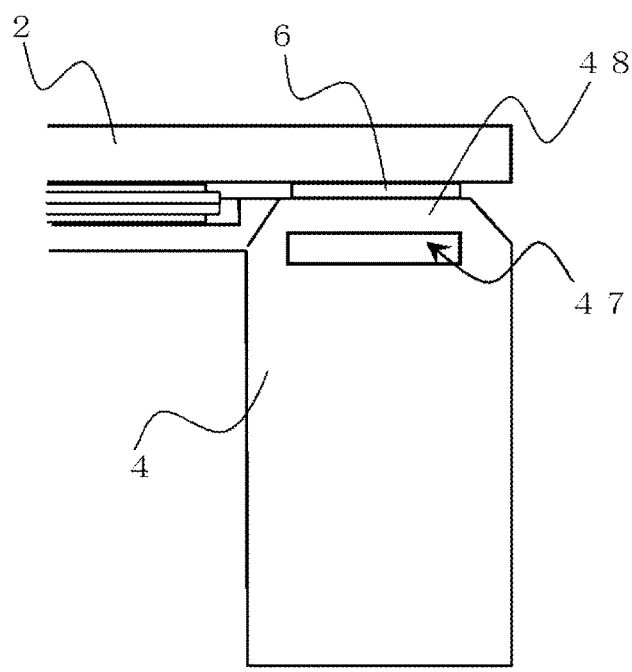
FIG. 8 is a cross-sectional view of the display device according to this disclosure.
Figure 9:
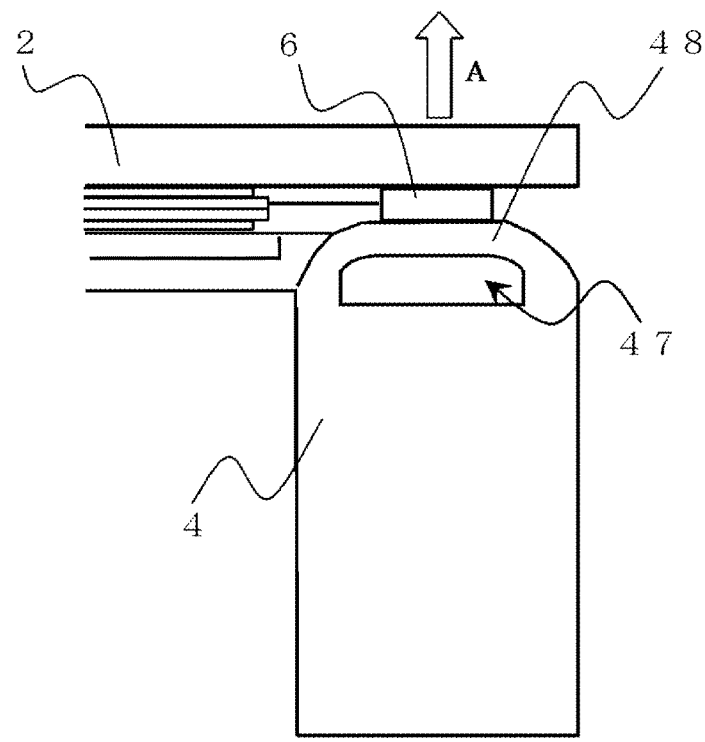
FIG. 9 is a cross-sectional view of the display device according to this disclosure.

FIGS. 8 and 9 are cross-sectional views of a display device according to a second embodiment. The first embodiment employs a configuration in which the fall-prevention structure portion fixing the protective plate 2 is disposed in the fixing member 7 formed in the intermediate frame 4. However, the second embodiment employs a configuration in which the fixing member is not disposed, a support portion 48 is formed in an area of the intermediate frame 4 corresponding to the second adhesive member 6, and a hole 47 is formed to correspond to the support portion 48 as illustrated in FIG. 8. The same elements and operational advantages as in the first embodiment will not be described again.

As illustrated in FIG. 8, the hole 47 is formed to correspond to the support portion 48 of the intermediate frame 4 corresponding to the second adhesive member 6. When an impact is applied to the protective plate 2 as illustrated in FIG. 9, the intermediate frame 4 including the support portion 48 of the protective plate 2 in which the hole 47 is formed is deformed to absorb and absorb the impact applied to the protective plate 2, thereby suppressing the protective plate 2 from falling.

Since an impact absorbing portion of the protective plate 2 is formed integrally with the intermediate frame 4, it is possible to achieve simplification of the display device 10.

Figure 10:
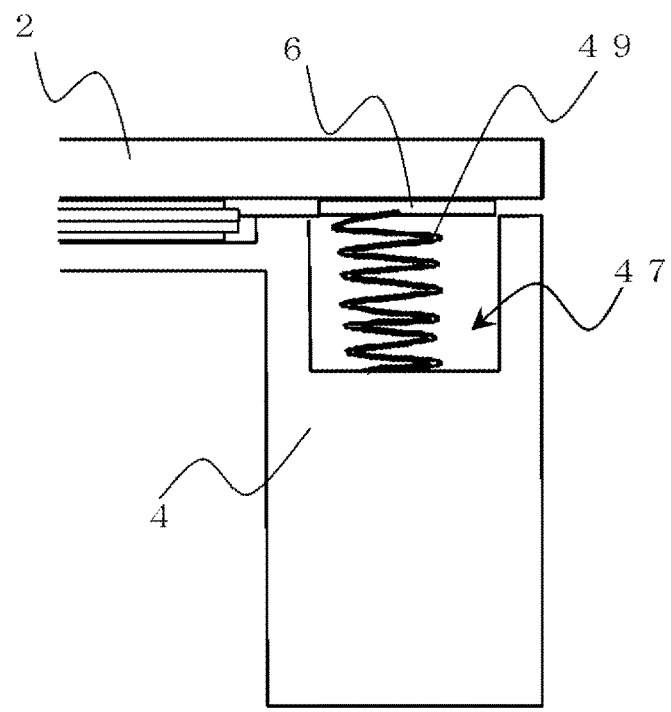
FIG. 10 is a cross-sectional view of the display device according to this disclosure.

FIG. 10 is a cross-sectional view of a display device according to a modified example of the second embodiment. As illustrated in FIG. 10, an elastic member 49 may be disposed in the hole 47, one end of the elastic member 49 may be fixed to the bottom of the hole 47, and the other end may be fixed to the second adhesive member 6 and fixed to the support portion 48 via the second adhesive member 6. By providing the elastic member 49, the stress B (see FIG. 7) applied to the protective plate 2 can be absorbed by deformation of the elastic member 49 fixed to the intermediate frame 4.

Housing of Electrical Equipment

In this disclosure, the housing of the electrical equipment includes an area for supporting the protective plate of the display device. A structure for partially absorbing an impact applied to the protective plate is formed. The housing of the electrical equipment is formed of a resin material such as acrylonitrile butadiene styrene copolymer (ABS) (not illustrated).

This disclosure is not limited to the configurations of the above-mentioned embodiments, but can be modified and combined in various forms without departing from the scope of this disclosure.

What is claimed is:

1. A display device comprising:
   a display panel;
   a light source unit, which irradiates the display panel;
   a frame, which supports the display panel and the light source unit; and
   a protective plate, which is disposed on a front surface of the display panel,
   wherein the protective plate provided with:
   an adhesive member disposed in a peripheral area of the frame that makes contact with both the frame and protective plate so as to secure the frame to the protective plate; and
   a fixing member that is supported by the adhesive member at a position corresponding to the adhesive member disposed in the peripheral area of the frame and is fixed to a fitting portion formed in the frame to be fixed to the frame, and
   wherein the fixing member includes a fall-prevention structure portion to suppress the protective plate from falling from the frame.

2. The display device according to claim 1,
   wherein the fall-prevention structure portion formed in the fixing member includes:
   an extension portion that extends from a position, at which the adhesive member is disposed and the fixing member and protective plate are fixed, in a direction opposite to the protective plate; and
   a stopper that is formed at a tip portion of the extension portion, and
   wherein a clearance between a fitting portion of the frame and the stopper formed at the tip portion.

3. The display device according to claim 1,
   wherein the fixing member includes a cutout at a center of an extension portion and is fitted to the fitting portion of the frame by an elastic deformation.

4. The display device according to claim 1,
   wherein the fixing member is disposed at least at a corner of the protective plate, in the peripheral area.

5. A display device comprising:
   a display panel;
   a light source unit, which irradiates the display panel;
   a frame, which supports the display panel and the light source unit; and
   a protective plate, which is disposed on a front surface of the display panel and is fixed to the frame with an adhesive member disposed in a peripheral area of the frame, wherein the adhesive makes contact with both the frame and protective plate; and wherein
   the frame includes an intermediate frame, the intermediate frame including a fall-prevention structure portion that suppresses the protective plate from falling at a position corresponding to the adhesive member disposed in the peripheral area of the frame.

6. The display device according to claim 5,
   wherein the fall-prevention structure portion is a hole that is formed at a position corresponding to the adhesive member, in the intermediate frame.

7. The display device according to claim 6,
   wherein the fall-prevention structure portion includes an elastic member that is disposed in the hole and fixed to the adhesive member and a bottom of the hole.

* * * * *